United States Patent [19]
Geyer

[11] Patent Number: 5,891,486
[45] Date of Patent: Apr. 6, 1999

[54] AUTOMATIC MILLING APPARATUS

[76] Inventor: Paul Geyer, 210-B N. Lindell Rd., Greensboro, N.C. 27403

[21] Appl. No.: 813,644

[22] Filed: Mar. 7, 1997

[51] Int. Cl.$^6$ .............................. B29C 47/62; B29C 47/66
[52] U.S. Cl. ...................... 425/208; 264/211.21; 366/81; 366/88; 366/90; 425/308
[58] Field of Search ..................................... 425/206, 207, 425/208, 204, 308, 310, 314; 264/211.21, 211.23; 366/81, 88, 90

[56] References Cited

U.S. PATENT DOCUMENTS

| | | |
|---|---|---|
| 2,535,865 | 12/1950 | Poncelet ............................... 425/192 R |
| 4,708,623 | 11/1987 | Aoki et al. . |
| 4,944,597 | 7/1990 | Geyer . |
| 5,129,729 | 7/1992 | Geyer . |
| 5,215,764 | 6/1993 | Davis et al. ............................ 425/208 |
| 5,217,303 | 6/1993 | Geyer . |
| 5,348,388 | 9/1994 | Geyer . |
| 5,409,366 | 4/1995 | Vincent ................................. 425/208 |
| 5,641,227 | 6/1997 | Geyer . |
| 5,698,235 | 12/1997 | Satoh et al. ............................ 425/208 |

Primary Examiner—Patrick Ryan
Assistant Examiner—Joseph Leyson
Attorney, Agent, or Firm—Robert W. Pitts

[57] ABSTRACT

An extrusion apparatus for processing, mixing and extruding thermoplastic and rubber materials includes a feed hopper feeding two barrier type extruders. Extrusion rotors include diagonal grooves with a barrier that has a restrictive clearance or gap relative to the extruder barrel bore. Fine material can pass through this gap, but larger material is led to a downstream end of the grooves. An abrasive barrel surface opposite the downstream end of the grooves grinds this larger material until it can pass or lead off through the smaller gap. Stationary knives located downstream of the abrasive section cut the exiting material into flakes. The barrel and barrier sections are conical and the size of the gap can be changed by relative movement between the barrel and the barriers. The extruders can operate adiabatically so that there is no change in extrusion temperature with speed and the volume of process flow.

18 Claims, 1 Drawing Sheet

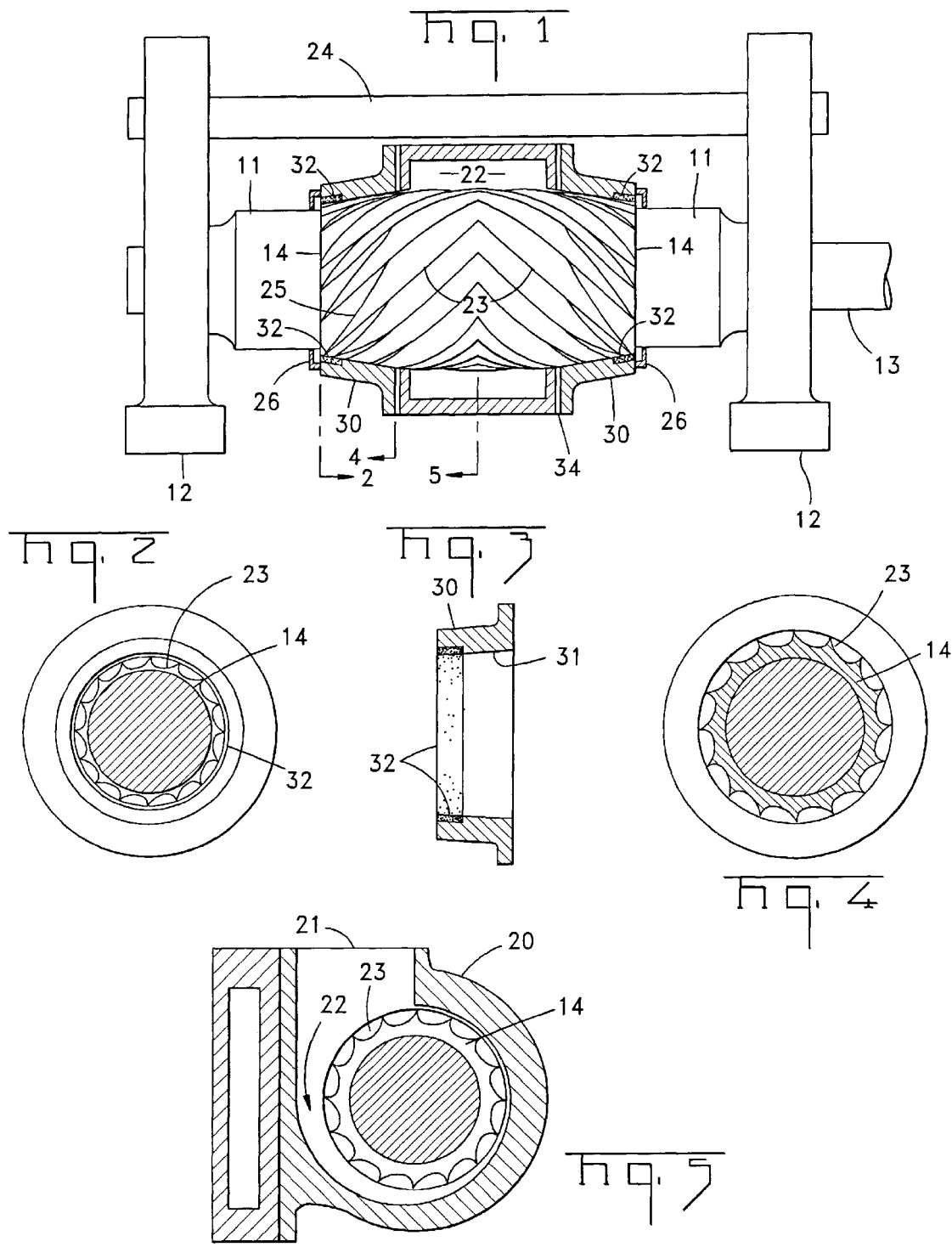

AUTOMATIC MILLING APPARATUS

BACKGROUND OF THE INVENTION

1. Field of the Invention

This invention relates to a process and an apparatus, particularly to an apparatus of the rotor and barrel type for the factory processing of thermoplastic and rubber like or polymeric materials up to the quality obtained by the small laboratory equipment.

2. Description of the Prior Art

The normal two roll factory size two roll mill produces a bank of material between the two rolls into which arriving process material must push its way into the bank. This action wastes the work that was used to extrude the material. Massed material in the bank is sheared by the action of the two rolls, an action referred to as turbulent flow and considered excellent. However, the imposed shear is directed to the path of least resistance, the already worked material and increases the non-uniformity of the processing. Additional working tends to hide the unequal processing, but can never equal the quality of uniformity processed material. Mills following a #27 internal mixer varies from two to seven mills, which complete the processing. Also, even if one mill was used, a mill man had to be in attendance to start and stop the feed strips as required.

This was the start of the art at the time of change over to radial ply tires. A massive millroom study was made in which all compounds were measured at each step of the mixing process. After hundreds of complete tests it became evident that a certain minimum of power, regardless of the equipment used, was required to obtain designed quality. Additional mixing with added power input was shown not to be cost effective. Thus the millroom state of the art made it cost effective to change over to radial ply tires.

Now, some forty years later, it is time to modernize the mixing process.

SUMMARY OF THE INVENTION

An extrusion apparatus for improved processing, mixing and extruding of thermoplastic and rubber like materials, consists of a feed hopper sandwiched between two barrier type extruders, with the rotor members rotatable within the bore of the barrel member. Interposed between the feed and discharge ends, is a hopper member which accepts the feed material and delivers it equally to the attached barrier type extruders. The rotor member extrusion grooves of the barrier section are crossed diagonally by a barrier which has restrictive clearance, barrier top to barrel bore. Fine and fluent material is led off over the barriers and the oversize and less fluent material is detained for extra working. The detained material proceeds to the down stream end of the section, where rasp like barrel configurations grinds the rejected material to acceptable size. Material passed over the barriers exits from the rotor groove where stationary knives slice the exiting material into flake like pieces, which have a high surface to volume ratio, for easy cooling. The extrusion grooves can be triangular in cross section or can have a tapered depth rectangle shape as required by the material being processed. The input work is only equal to the work required to warm the material and thereby the extruders are adiabatic in operation, i.e., no change in extrusion temperature with changes in rotor speed. The barriers sections are conical in shape and thereby capacity and extrusion temperature can be changed by endwise movement of the barrel members in relation to the rotor members. The movement is adjusted by inserting circular spacers between the hopper and barrier barrel sections. An added feature is a barrel for reworking the delayed material at the down stream end of the section is an abrasive barrel design which is arranged to reduce the size of the delayed material.

It is therefore a feature of the present invention to provide an improved extrusion apparatus which uniformly and continuously processes the extrusion material through an imposed order of mixing to warm, blend, refine and extrude the material to exact parameters.

Another feature of the present invention is to provide the required geometry as a revision of an existing two roll mill.

Still another feature of the present invention is to apply numerous mixing geometries of small extruders on a large diameter extruder, so as to obtain small extruder quality plus a respectable quantity.

A further feature of the present invention is to provide adiabatic extrusion, so that high speeds can be possible at no rise in extrusion temperature.

Another feature of the present invention is to provide a hopper member with geometry that divides the entering process material to the two extruders, with left hand and right hand leads on each side of center.

Still another feature of the present invention is to provide both extruders with a conical design, so that end wise movement of the rotor to the barrel adjusts the clearance, barrier tops to barrel bore.

A further feature of the present invention is to provide a barrel member with an abrasive surface at the down stream end of the barrier sections, which is arranged to reduce the size of any material rejected by the up-stream geometry.

A feature of the present invention is to provide knives, attached to the barrel member and are arranged to slice the exiting material as it leaves the rotor extrusion grooves.

Another feature of the present invention is to provide automatic means of accepting and sending process material without the services of a mill man.

Finally it an object to provide an improved extrusion apparatus which costs less to buy, is easily installed, and produces product quality not possible on present day factory size equipment.

BRIEF DESCRIPTION OF THE DRAWINGS

FIG. 1 is a plan view of the milling apparatus, partly in section and constructed in accordance with the present invention and which represents the preferred embodiment.

FIG. 2 shows the discharge end of an extruder, partly in section.

FIG. 3 is a cross sectional view of the barrel member of the barrier section.

FIG. 4 shows the entrance to the barrier section, also partly in section

FIG. 5 is a cross sectional view of the apparatus at the center line of the hopper member.

DESCRIPTION OF THE PREFERRED EMBODIMENT

As an introduction to the present invention there is a new and improved method and extrusion apparatus of the rotor and barrel type, consisting of a feed means or hopper, sandwiched between two barrier type extruders. It is a well known fact that the extrusion of laboratory size extruders is superior in quality when compared to the extrusion of factory size extruders. Therefore the small extruder groove geometry as to cross section and length, is duplicated on a large rotor on the right and left hand each side of center. The clearance of the hopper rotor to the coacting barrel member generates a long horn angle, which completely fills the rotor grooves, pressurizes and moves the material to the attached rotor barrier grooves. The rotor barrier grooves are created by diagonal barriers which are designed to lead off the fine and fluent material and to delay the over size and less fluent material for extra working. The down stream ends of the barrier sections, which tend to accumulate over size material, coact with a barrel member which has an abrasive rasp-like surface design to abrade and reduce the delayed material to acceptable size. The post barrier rotor extrusion grooves start at zero capacity and increase to full capacity, at the down stream end of the sections where knives attached to the stationary barrel members slice the exiting material. This differs from the normal pellet, which cut the material being pushed though a hole at right angles to the pellet plate surface. The resulting flakes have an area to volume which improves the rate of cooling.

The length of the rotor grooves is such that the work of extrusion is approximately even to the work required to warm the material and thereby the extrusion is adiabatic and thereby the extrusion is at the same temperature through the full speed range of the extruder. Thereby capacity can be two to three times normal. The barrier sections have a conical rotor operating in a conical barrel member and thereby endwise movement, via barrel member shims, can be used to control capacity can and thereby the temperature of the extrusion. The multiple extruder grooves and high speed operation can be such that adequate capacity can be obtained. The apparatus is such that in can be applied to an operable mill, in short order and is a nice compromise with the Mill diehards.

Referring now to the drawings of the extrusion apparatus, FIG. 1 is a plan view showing the apparatus in accordance with the preferred embodiment of the invention as applied to the continuous warming, mixing and extruding of the process material. A two roll operating mill with one roll removed is depicted as rotor 11, bearing 12 and rotor 13, which is the apparatus to be revised. Improved milling apparatus 14 is a cylindrical enlargement of the remaining roll.

Replacing the removed roll is a beam 24 which anchors the barrel member of the apparatus being installed on the remaining roll.

FIG. 1 shows the knives 26 attached to the barrel member and arranged to cut the process material as it exits from rotor extrusion grooves 23. The cutting of flakes is different than pellets, as the pellet material is pushed out of holes at right angles while the flakes are cut from an operating extrusion groove generating extrusion pressure.

FIG. 2 is a cross section showing the discharge ends of the barrier sections 30.

FIG. 3 is a cross sectional view of the barrier sections 30 showing the abrasive barrel surface 32.

FIG. 4 is a cross section showing the entrance to the barrier section 30 and showing the triangular extrusion grooves 23.

In the apparatus 14 for the warming, mixing, refining and extruding of plastic and rubber like materials, the geometry of which is a multiple of the grooves of small extruders, which are known to extrude superior quality than the factory size extruders and thereby produce quality with adequate quantity for factory operation. The hopper member 20, sandwiched between two barrier screw designs is provided with rotor extrusion grooves 23, right hand and left hand of center, which co-act with a long horn angle opening 22 between the rotor and barrel members to warm, pressurize the material, fill the extrusion grooves, and move it away from center to the entrance of rotor barrier grooves 23 of the tapered in diameter rotor and barrier sections 30. The barrier sections are formed by barriers 25 diagonally crossing extruder grooves 23 so that the fine and fluent may pass between the top of barrier 25 and barrel bore. In other words, each diagonal barrier 25 is a solid obstruction of the corresponding groove 23, and the material in each groove 23 must flow over the top of the corresponding barrier 25 in order to continue downstream in groove 23. These barriers 25 divide the corresponding grooves 23 into first upstream groove sections and second downstream groove sections. Since the barriers 25 are diagonal, the triangular cross-sectional area, and hence the volume, of the first groove sections decrease in the downstream direction. For the same reason, the triangular cross-sectional area, and hence the volume, of the second groove sections increase in the downstream direction. The rejected material, which cannot pass over the tops of the barriers 25, proceeds to the down stream end of the barrier 25, where the co-acting barrel 30 is provided with an abrasive rasp-like annular section 32 which reduces the rejected material to acceptable size and directs it back into the main stream. Material exiting from the barrel grooves 23 is sliced by stationary knives 26, attached to the barrel member 30, into chip like pieces easy to cool and convey to down stream apparatus. The tapered in diameter barrier section barrels 30 have a smooth tapered bore, which by means of circular shims can be adjusted end wise. This motion, displacement of the barrel 30 relative to the rotor member 11, adjusts the clearance rotor to barrel bore, and thereby adjusts the extrusion capacity and the resulting extrusion temperature. The length and cross section of the extruder grooves 23 are such that the imposed work of extrusion is only equal to the work required to warm the process material and thereby the extrusion is adiabatic, and changes in rotor speed does not change the extrusion temperature. Thereby high speeds are possible at the design temperature. This arrangement plus the large number of extrusion grooves 23 can produce a capacity sixty to seventy times that of the small extruder design.

This apparatus could also use two rolls 11, acting with a common hopper 20, so as to double capacity or an increased number of small extrusion grooves.

It is a well established fact that small laboratory equipment produces superior quality than similar factory equipment. To bring the factory equipment up to laboratory standards, the proposed equipment is therefore provided with multiple laboratory size grooves so as to achieve laboratory quality with factory size equipment. The hopper opening 21 is adequately large and connects to a horn angle 22 as shown in FIG. 5, which is arranged to completely fill the rotor extrusion grooves 23 on the right and left hand sides of center and arranged to move the process material equally in both directions away from the center of the hopper. The helical grooves 23 have a triangular cross section, replacing the usual rectangular cross section extruder grooves. This design assembles the warmed process material at the trailing edge of the groove, which makes the flow over the barrier more efficient, as the warmed material is led off in preference to the less fluent material.

The hopper rotor grooves 23 connect to and continue through the barrier sections 30, and are diagonally crossed by barriers 25 in a manner such that all acceptable material must pass over the barriers 25. At the down stream ends, the smooth tapered bore 31 of the barrel merges with a rasp like surface 32 which tends to refine the detained material. The abrasive rasp-like surface 32 can be a hardened steel insert having a significantly rougher surface than the normal smooth inner bore of a barrel section.

I claim:

1. An apparatus comprising a rotor disposed in a barrel and configured to extrude a polymeric material, the rotor including grooves with barriers in each groove extending diagonally relative to the axis of the rotor and the corresponding groove to form first groove sections, the volume of the first groove sections decreasing in a downstream direction so that material is forced through a gap between the barriers and the barrel, material larger than the gap being progressively forced to the downstream ends of the first groove sections; the barrel including an abrasive surface juxtaposed to the downstream ends of the first groove sections to abrade material of larger size so that the material can pass through the gap between the barriers and the barrel.

2. The apparatus of claim 1 wherein the apparatus is a roll mill for processing solid pieces of polymeric material to reduce the polymeric material to a uniform size.

3. The apparatus of claim 2 wherein the apparatus is a two roll mill.

4. The apparatus of claim 1 wherein the abrasive surface comprises a rasp surface.

5. The apparatus of claim 1 wherein the abrasive surface is formed on an insert positioned in an otherwise smooth bore of the barrel.

6. The apparatus of claim 1 further comprising a hopper section, material being fed from the hopper section to a section including the barriers.

7. The apparatus of claim 6 wherein the hopper section is located between two barrels so that material may be extruded in opposite directions.

8. The apparatus of claim 1 wherein the first groove sections have a triangular cross section.

9. The apparatus of claim 1 wherein the barriers separate a series of first groove sections from a series of second groove sections located downstream of the first groove sections.

10. The apparatus of claim 9 wherein the volume of the second grooves increases in the downstream direction.

11. The apparatus of claim 1 wherein knives are located at the downstream end of the barrel, the knives cutting the extruded material to form flakes.

12. The apparatus of claim 1 wherein the diameter of the barrel is tapered so that the downstream end of the barrel has a smaller diameter than the upstream end of the barrel.

13. The apparatus of claim 12 further including a plurality of shims for moving the barrel section relative to the barriers and the rotor to change the size of the gap.

14. An apparatus comprising a rotor disposed in a barrel and configured to extrude a polymeric material, the rotor including grooves with barriers extending diagonally relative to the axis of the rotor to form first groove sections, the volume of the first groove sections decreasing in a downstream direction so that material is forced through a gap between the barriers and the barrel, material larger than the gap being progressively forced to the downstream ends of the first groove sections; means located on the barrel juxtaposed to the downstream ends of the first groove sections for abrading material larger than the gap to permit the material to pass through the gap; and means for adjusting the size of the gap for adiabatic extrusion of the polymeric material.

15. The apparatus of claim 14 comprising two extruders fed from a common hopper located between the extruders.

16. The apparatus of claim 14 wherein the means for adjusting the size of the gap comprises shims for changing the position of the barrel relative to the rotor.

17. The apparatus of claim 16 wherein the barrel is conical.

18. The apparatus of claim 17 wherein the means for abrading material comprises a conical section located at the downstream end of the barrel, the conical section having a surface roughness greater than the remainder of the barrel.

* * * * *